US010063681B2

(12) United States Patent
Choi et al.

(10) Patent No.: US 10,063,681 B2
(45) Date of Patent: *Aug. 28, 2018

(54) WEARABLE DEVICE PAIRED WITH MOBILE TERMINAL AND OPERATING METHOD THEREOF

(71) Applicant: Samsung Electronics Co., Ltd., Suwon-si (KR)

(72) Inventors: Chang Mok Choi, Seoul (KR); Sang Joon Kim, Hwaseong-si (KR); Su-Hyun Na, Seoul (KR); Yu-Jin Na, Seoul (KR); Jong Kee Lee, Seoul (KR); Soon Kyu Jang, Gwacheon-si (KR); Young Ei Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 182 days.

This patent is subject to a terminal disclaimer.

(21) Appl. No.: 14/524,864

(22) Filed: Oct. 27, 2014

(65) Prior Publication Data

US 2015/0288796 A1    Oct. 8, 2015

(30) Foreign Application Priority Data

Apr. 7, 2014 (KR) .................. 10-2014-0041242

(51) Int. Cl.
*H04M 1/725* (2006.01)
*G06F 3/01* (2006.01)

(52) U.S. Cl.
CPC ........ *H04M 1/72527* (2013.01); *G06F 3/017* (2013.01); *H04M 1/72519* (2013.01)

(58) Field of Classification Search
CPC ............ H04M 1/663; H04M 1/72527; H04M 1/72544; H04M 1/72577; H04M 1/72583; H04M 3/543; H04M 3/42093; H04W 48/18; G10L 12/08; G10L 15/22; G06Q 10/10

See application file for complete search history.

(56) References Cited

U.S. PATENT DOCUMENTS

| 2005/0060185 A1* | 3/2005 | Balogh ................. G06Q 10/10 705/2 |
| 2006/0135219 A1* | 6/2006 | Kim .................. H04M 1/72544 455/573 |
| 2009/0096746 A1 | 4/2009 | Kruse et al. |
| 2009/0326406 A1 | 12/2009 | Tan et al. |
| 2011/0059769 A1 | 3/2011 | Brunolli |
| 2012/0309466 A1 | 12/2012 | Vartanian |

(Continued)

FOREIGN PATENT DOCUMENTS

| JP | 2007-96449 A | 4/2007 |
| JP | 2008-263277 A | 10/2008 |

(Continued)

*Primary Examiner* — Thanh Le
(74) *Attorney, Agent, or Firm* — NSIP Law

(57) ABSTRACT

A wearable device and corresponding method include producing, at a wearable device, an incoming call processing option list in response to a rejection input from a user rejecting an incoming call from a mobile terminal. The wearable device and corresponding method further transmit, from the wearable device to the mobile terminal, a result value corresponding to a gesture of the user and in response to the incoming call processing option list.

22 Claims, 9 Drawing Sheets

(56) References Cited

U.S. PATENT DOCUMENTS

| | | | |
|---|---|---|---|
| 2012/0315880 A1 | 12/2012 | Peitrow et al. | |
| 2013/0247113 A1 | 9/2013 | Zheng et al. | |
| 2013/0303133 A1* | 11/2013 | Sansalone | H04M 1/72519 455/414.1 |
| 2014/0134983 A1* | 5/2014 | Jung | H04M 3/436 455/414.1 |
| 2015/0080058 A1* | 3/2015 | Rhee | H04M 1/72583 455/566 |
| 2015/0220154 A1* | 8/2015 | Midholt | G06F 3/014 345/156 |
| 2015/0312409 A1* | 10/2015 | Czarnecki | H04M 3/42093 455/414.1 |
| 2015/0350413 A1* | 12/2015 | Ma | H04M 1/72577 455/418 |
| 2016/0119462 A1* | 4/2016 | Goldstein | H04W 4/008 455/556.1 |

FOREIGN PATENT DOCUMENTS

| | | |
|---|---|---|
| JP | 2009-124372 A | 6/2009 |
| KR | 2001-0083806 A | 9/2001 |
| KR | 2001-0107158 A | 12/2001 |
| KR | 10-2005-0105025 A | 11/2005 |
| KR | 10-2005-0121305 A | 12/2005 |
| KR | 10-2006-0000828 A | 1/2006 |
| KR | 10-2006-0029990 A | 4/2006 |
| KR | 10-2007-0103114 A | 10/2007 |
| KR | 10-2007-0105107 A | 10/2007 |
| KR | 10-2010-0130478 A | 12/2010 |
| KR | 10-2011-0129473 A | 12/2011 |
| KR | 10-2012-0106514 A | 9/2012 |
| KR | 10-2013-0094329 A | 8/2013 |

* cited by examiner

WEARABLE DEVICE PAIRED WITH MOBILE TERMINAL AND OPERATING METHOD THEREOF

CROSS-REFERENCE TO RELATED APPLICATION(S)

This application claims the benefit under 35 USC 119(a) of Korean Patent Application No. 10-2014-0041242, filed on Apr. 7, 2014, in the Korean Intellectual Property Office, the entire disclosure of which is incorporated herein by reference for all purposes.

BACKGROUND

1. Field

The following description relates to an operating method of a wearable device paired with a mobile terminal.

2. Description of Related Art

Amid the proliferation of smart phones, a variety of mobile devices are being developed and wearable type mobile devices have been emerging.

A mobile device may provide a great deal of convenience for modern life. A growing computing power of mobile devices enable users to complete tasks previously performed using a personal computer (PC).

Also, the wearable mobile device is sometimes referred to as an appcessary, which is derived from an amalgamation of application and accessory. Dissimilar to a handheld mobile device, the wearable device is attached to a body and facilitates reception and transmission of a signal related to the mobile device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an illustrative example, there is provided a method, including producing, at a wearable device, an incoming call processing option list in response to a rejection input from a user rejecting an incoming call from a mobile terminal; and transmitting, from the wearable device to the mobile terminal, a result value corresponding to a gesture of the user and in response to the incoming call processing option list.

The producing may include producing the incoming call processing option list to comprise rejection messages pre-stored in the wearable device or the mobile terminal and pre-stored abbreviations of the rejection messages.

The producing may include producing the incoming call processing option list to comprise rejection messages edited in the wearable device or the mobile terminal and edited abbreviations of the rejection messages.

The method may also include storing the edited rejection messages and the edited abbreviations in at least one of the wearable device and the mobile terminal.

The gesture of the user may include a touch or a drag input by the user in response to the incoming call processing option list displayed on a display of the wearable device.

The gesture of the user comprises at least one of an electromyogram (EMG) signal generated before and after a muscular movement caused by the gesture of the user and an acceleration signal generated by the gesture of the user.

The transmitting may include comparing the EMG signal or the acceleration signal to a pre-stored signal in response to the incoming call processing option list; and transmitting a rejection message corresponding to a result of the comparing.

The result value corresponding to the gesture of the user may include at least one of rejection messages, and abbreviations and icons of the rejection messages comprised in the incoming call processing option list.

The result value corresponding to the gesture of the user may include an index of rejection messages comprised in the incoming call processing option list.

The method may also include receiving the rejection input based on the gesture of the user to reject the incoming call to the mobile terminal.

In response to the rejection input, the method may also include sensing a signal generated by the gesture of the user; determining whether the signal generated by the gesture of the user is a pre-stored signal; and in response to determining that the signal generated by the gesture of the user is dissimilar to the pre-stored signal, entering a standby mode.

In accordance with another illustrative configuration, there is provided a computer program embodied on a non-transitory computer readable medium, the computer program being configured to control a processor to perform the method described above.

In accordance with an illustrative example, there is provided a wearable device, including a communication unit configured to receive from a mobile terminal an incoming call; and a processor configured to receive a rejection input rejecting the incoming call, produce an incoming call processing option list in response to the rejection input, and control the communication unit to transmit to the mobile terminal a result value corresponding to a gesture received from a user and in response to the incoming call processing option list.

The wearable device may also include a sensor unit configured to sense an input of the gesture of the user in response to the incoming call processing option list, wherein the sensor unit comprises at least one of an electromyogram (EMG) sensor, an acceleration sensor, a gyrosensor, a geomagnetic field sensor, an impedance sensor, a photosensor, a force sensor, a strain gauge, and a pressure sensor.

The processor may be further configured to provide the incoming call processing option list comprising rejection messages pre-stored in the wearable device or the mobile terminal and pre-stored abbreviations of the pre-stored rejection messages in response to the rejection input.

The processor may be further configured to produce the incoming call processing option list to comprise rejection messages edited in the wearable device or the mobile terminal and edited abbreviations of the edited rejection messages in response to the rejection input.

The processor may be further configured to store the edited rejection messages and the edited abbreviations in at least one of the wearable device and the mobile terminal.

The gesture of the user may include at least one of a touch or a drag input from the user in response to the incoming call processing option list, an electromyogram (EMG) signal generated before and after a muscular movement caused by the gesture of the user, and an acceleration signal generated by the gesture of the user.

The processor may be further configured to compare the EMG signal or the acceleration signal generated by the gesture of the user to a pre-stored signal in response to the incoming call processing option list, and transmit a rejection message corresponding to a result of the comparing to the mobile terminal.

The result value corresponding to the gesture of the user may include at least one of rejection messages, and abbreviations and icons of the rejection messages comprised in the incoming call processing option list, wherein the at least one corresponds to the gesture of the user, or comprises an index of the rejection messages comprised in the incoming call processing option list.

The processor may be further configured to receive the rejection input based on the gesture of the user.

In accordance with another illustrative example, there is provided a wearable device, including a sensor configured to sense a gesture from a user in response to the user rejecting an incoming call from a mobile terminal; and a processor configured to produce an incoming call processing option list in response to the user rejecting the incoming call, and transmit to the mobile terminal a result value corresponding to the gesture and based on the incoming call processing option list.

The gesture of the user may include an electromyogram signal, an acceleration signal, a geomagnetic change, a change in ambient light, and a change in pressure produced by gestures performed by the user with a portion of a body of the user to which the wearable device is attached.

The sensor may include at least one of an EMG sensor, an acceleration sensor, a gyrosensor, a geomagnetic field sensor, an impedance sensor, a photosensor, a force sensor, a strain gauge, and a pressure sensor.

The wearable device may also include a touch display configured to display the incoming call processing option list.

Other features and aspects will be apparent from the following detailed description, the drawings, and the claims.

BRIEF DESCRIPTION OF THE DRAWINGS

These and/or other aspects will become apparent and more readily appreciated from the following description of the embodiments, taken in conjunction with the accompanying drawings in which.

Figure 1:
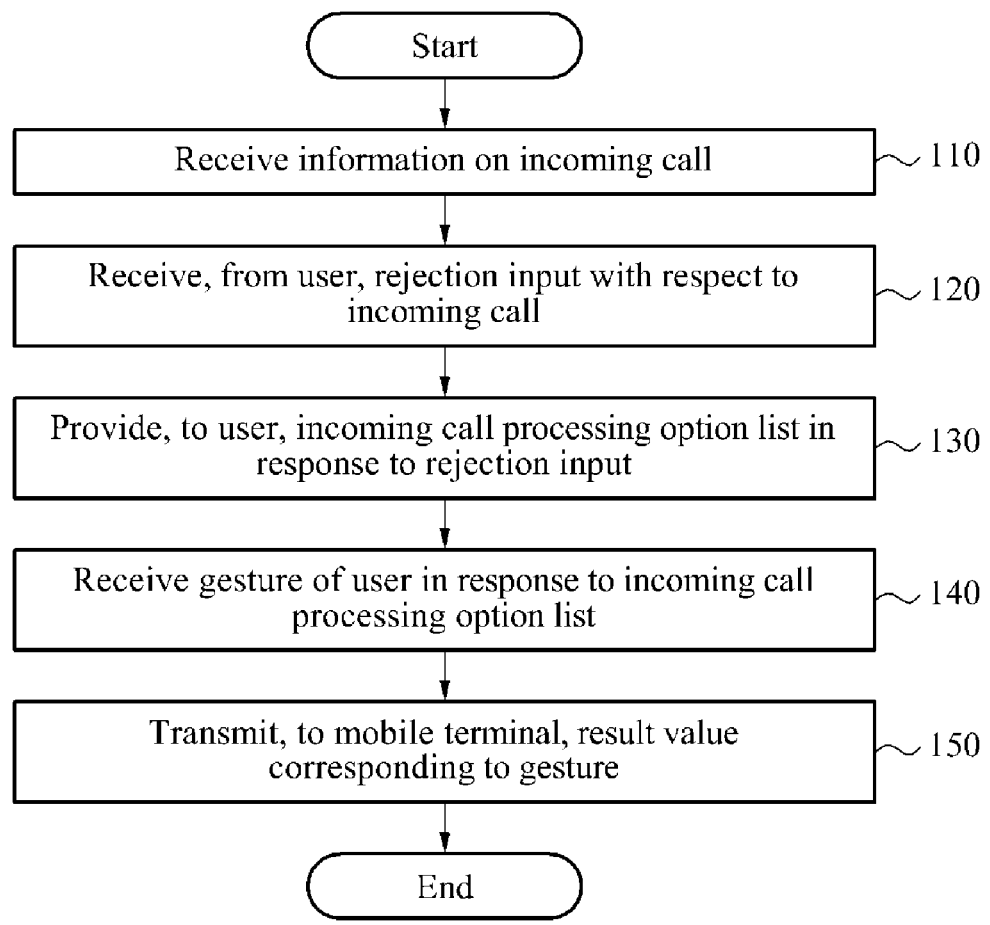
FIG. 1 is a flowchart illustrating an example of an operating method of a wearable device, in accord with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

It will also be understood that when an element or layer is referred to as being "on" or "connected to" another element, device, or layer, it can be directly on or connected to the other element or layer or through intervening elements or layers may be present. In contrast, when an element is referred to as being "directly on" or "directly connected to" another element or layer, there are no intervening elements, devices, or layers present.

FIG. 1 is a flowchart illustrating an example of an operating method of a wearable device, in accordance with an embodiment.

Referring to FIG. 1, in operation 110, the method receives at the wearable device information about an incoming call to a mobile terminal. The wearable device receives the information from the mobile terminal, which is operatively connected to the wearable device through short range communication. The mobile terminal or mobile device connected to the wearable device through the short range communication may also be referred to as a mobile terminal or a mobile device paired with the wearable device.

The wearable device is attachable to, wearable on, or detachable from a portion of a body using an arm band, a wrist band, or other fixing elements or mechanisms. The wearable device is a hardware or structural device including, but not limited to, a processor, a controller, a receiver, a transmitter and/or a memory. In one illustrative configuration, the mobile terminal is a smartphone or a communication device having a function similar to the smartphone. The mobile terminal is a platform that allows the broadcasting of a data signal, an audio signal, and/or video signal with their multimedia content and for the digital transmission of data and communication based on Internet Protocol. This includes a cellular phone, a portable digital player, a computer tablet, or a wireless game console.

In operation 120, the method receives at the wearable device a rejection input from a user to reject the incoming call. The user inputs the rejection input by touching or dragging a rejection button or a rejection icon indicated on a touch display of the wearable device.

In operation 120, the rejection input to reject the incoming call is made through a value sensed by a sensor unit based on the gesture of the user. The sensor unit senses, for example, an electromyogram (EMG) signal, an acceleration signal, a geomagnetic signal, an impedance, an optical change, a change in a force, a change in an external force, and a change in pressure based on the user gesture. The sensor unit may include at least one of an EMG sensor, an acceleration sensor, a gyrosensor, a geomagnetic field sensor, an impedance sensor, a photosensor, a force sensor, a strain gauge, and a pressure sensor.

In operation 130, through the wearable device and in response to the rejection input, the method produces an incoming call processing option list to the user. The incoming call processing option list is a list or a menu including various processing options or service options in association with the incoming call, for example, reception of the incoming call, and transmission and reception of a message related to the reception of the incoming call.

In operation 130, through the wearable device, the method produces the incoming call processing option list, including rejection messages pre-stored in a memory of the wearable device or the mobile terminal at a time of manufacture, and pre-stored abbreviations of the pre-stored rejection messages. In an alternative configuration, the method enables the user to modify the rejection messages pre-stored in the memory through the wearable device to better reflect the user's personal circumstances to reject the incoming call.

The pre-stored rejection messages may include, for example, "I am in class now, so I will call you later," "I am in a meeting now, so I will call you later," "I am driving now, so I will call you later," and "I will call you later." The abbreviations of the rejection messages may include, for example, "meeting," "class," "driving," and "later."

In operation 140, through the wearable device, the method receives a gesture of the user in response to the incoming call processing option list. The gesture includes a touch or a drag input by the user in response to the incoming call processing option list indicated on a touch display of the wearable device. Also, the gesture may include at least one of an EMG single generated before and after a muscular movement of the gesture and an acceleration signal of the gesture.

In operation 150, through the wearable device, the method transmits a result value corresponding to the gesture input received in operation 140 to the mobile terminal. The result value corresponding to the gesture may include any one of the rejection messages, and the abbreviations and icons of the rejection messages included in the incoming call processing option list.

The icons corresponding to the rejection messages include icons reflecting situations pertinent for each rejection message, for example, an icon having a pointer or a blackboard for a rejection message related to the meeting, an icon with a form of a driver grabbing a steering wheel for a rejection message related to the driving, and an icon having a form of a person sitting at a desk and looking at a book for a rejection message related to the class.

Also, the result value corresponding to the gesture may include an index of the rejection messages included in the incoming call processing option list.

For example, the rejection messages, the abbreviations, or the icons included in the incoming call processing option list are indexed. The wearable device transmits the index corresponding to each rejection message to the mobile terminal. The mobile terminal receiving the index delivers the rejection messages, the abbreviations, or the icons corresponding to the index to a counterpart.

Figure 2:
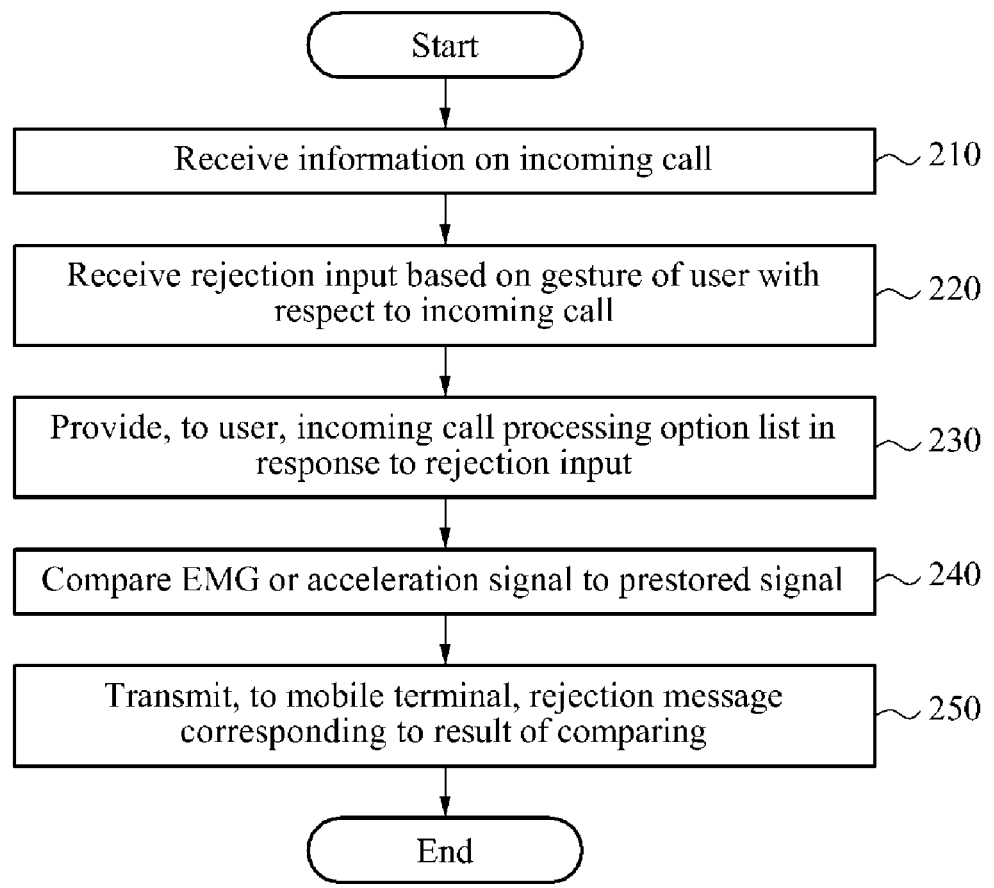
FIG. 2 is a flowchart illustrating another example of an operating method of a wearable device, in accord with an embodiment.

FIG. 2 is a flowchart illustrating another example of an operating method of a wearable device, in accordance with an embodiment.

Referring to FIG. 2, in operation 210, through the wearable device, the method receives, from a mobile terminal operatively connected to the wearable device through short range communication, information on the incoming call to the mobile terminal.

In operation 220, the method at the wearable device receives, from a user, a rejection input to reject the incoming call to the mobile terminal.

In operation 230, the method at the wearable device produces, to the user, an incoming call processing option list in response to the rejection input by the user.

In operation 240, the method at the wearable device compares an EMG signal or an acceleration signal of the user to a pre-stored signal in response to the incoming call processing option list produced in operation 230.

In operation 250, the method, through the wearable device transmits to the mobile terminal a rejection message corresponding to a result of the comparing in operation 240.

For example, an EMG signal generated by a gesture of folding and unfolding a left thumb of the user is "1," an EMG signal generated by a gesture of folding and unfolding a left index finger of the user is "3," and the EMG signals may be pre-stored. Also, a rejection message corresponding to the EMG signal 1 may be "I am in a meeting now, so I will call you later," and a rejection message corresponding to the EMG signal 3 may be "I am driving now, so I will call you later."

In one example, the user inputs a rejection to the wearable device in response to the incoming call. The wearable device produces the incoming call processing option list to the user in response to the rejection input. Through a gesture, the user selects a desirable option to be performed from among options or entries included in the incoming call processing option list.

For example, when an EMG signal generated in association with the option selected by the user from the incoming call processing option list is "1.1," the wearable device compares the EMG signal 1.1 generated in association with the selected option to pre-stored EMG signals 1 and 3. The wearable device considers the EMG signal 1 that is within a range of similarity to the EMG signal 1.1, for example, 85% or 90% similarity, among the pre-stored ENG signals to be a signal corresponding to the EMG signal 1.1.

The wearable device transmits, to the mobile terminal, the rejection message of "I am in a meeting now, so I will call you later," which corresponds to a result of the comparing.

Figure 3:
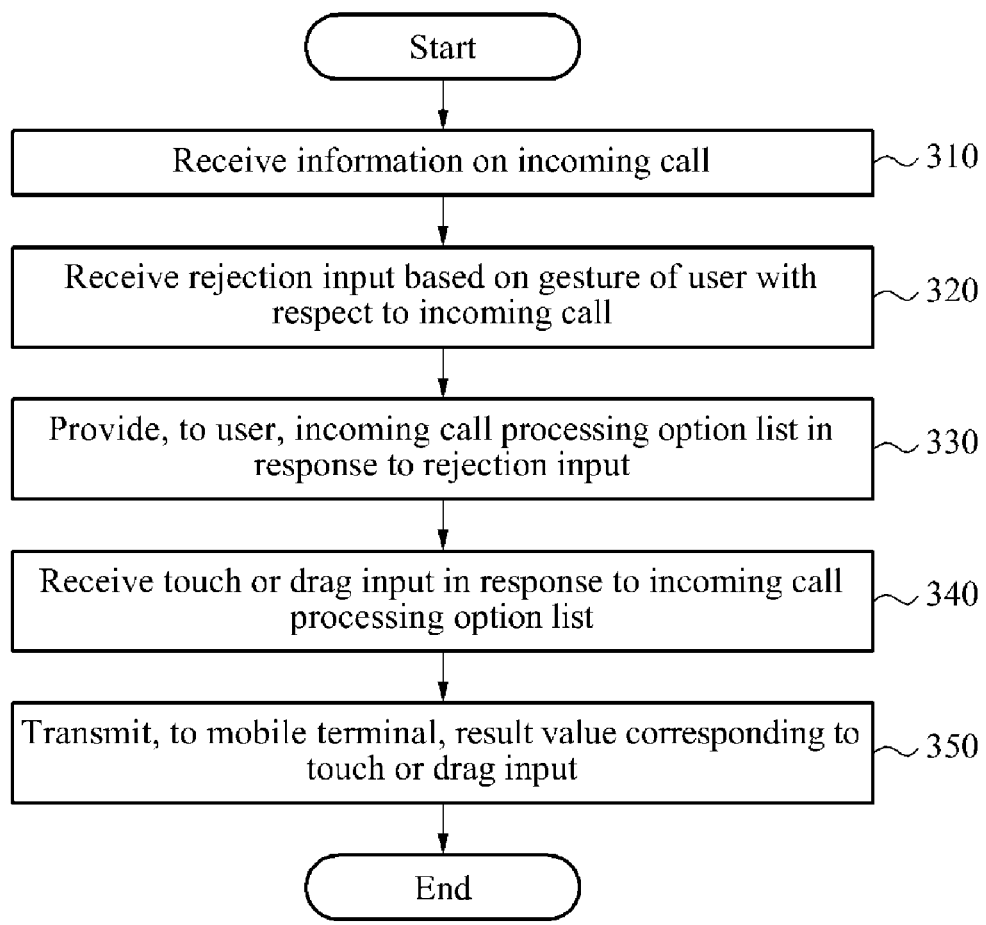
FIG. 3 is a flowchart illustrating still another example of an operating method of a wearable device, in accordance with an embodiment.

FIG. 3 is a flowchart illustrating still another example of an operating method of a wearable device, in accordance with an embodiment.

Referring to FIG. 3, in operation 310, the method at the wearable device receives information of an incoming call from a mobile terminal connected to the wearable device through short range communication.

In operation 320, the method at the wearable device receives a rejection input to reject the incoming call based on a gesture of a user of the wearable device. The rejection input received in operation 320 may be made through the gesture of the user sensed by a sensor unit included in the wearable device. The rejection input received in operation 320 may be made by predetermined gestures of the user, for example, touching or dragging a rejection button or a rejection icon displayed on a touch display. In an alternative, the rejection input may be made by the user nodding or shaking a head, where the wearable device would be either positioned close to the head or with a sensor unit that is positioned on or close to the head.

In operation 330, the method, through the wearable device, produces an incoming call processing option list to the user in response to the rejection input.

Figure 7:
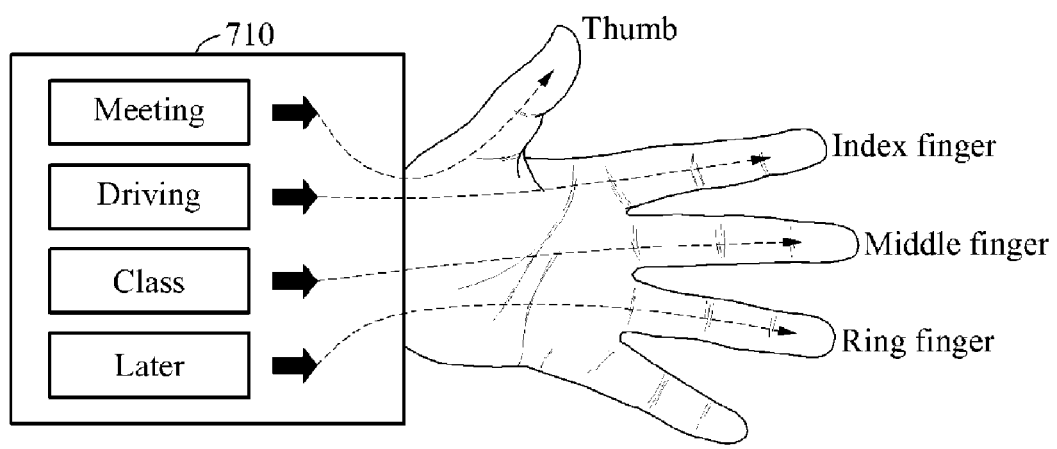
FIG. 7 is a diagram illustrating an example of a method of receiving a gesture of a user from a wearable device, in accordance with an embodiment.
Figure 8:
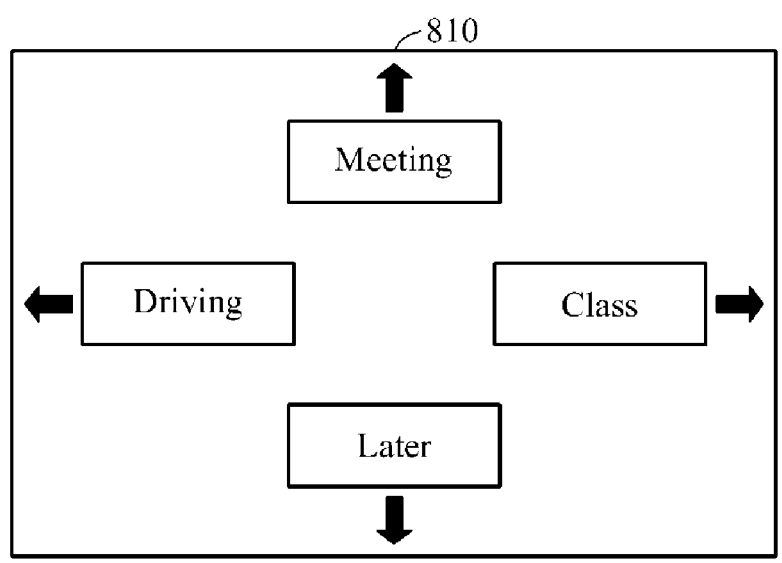
FIG. 8 is a diagram illustrating another example of a method of receiving a gesture of a user from a wearable device, in accordance with an embodiment.

In operation 340, the method at the wearable device receives a touch or a drag input from the user in response to the incoming call processing option list displayed on the touch display. As illustrated in FIGS. 7 and 8, the touch display of the wearable device displays abbreviations of rejection messages included in the incoming call processing option list or icons related to the rejection messages.

In operation 350, the wearable device transmits, to the mobile terminal, a result value corresponding to the touch or the drag input by the user received in operation 340, in response to the incoming call processing option list.

For example, the wearable device transmits to the mobile terminal a rejection message corresponding to a position or a direction in which or to which the user touches or drags the rejection button or the rejection icon, or an index of the rejection messages.

Figure 4:
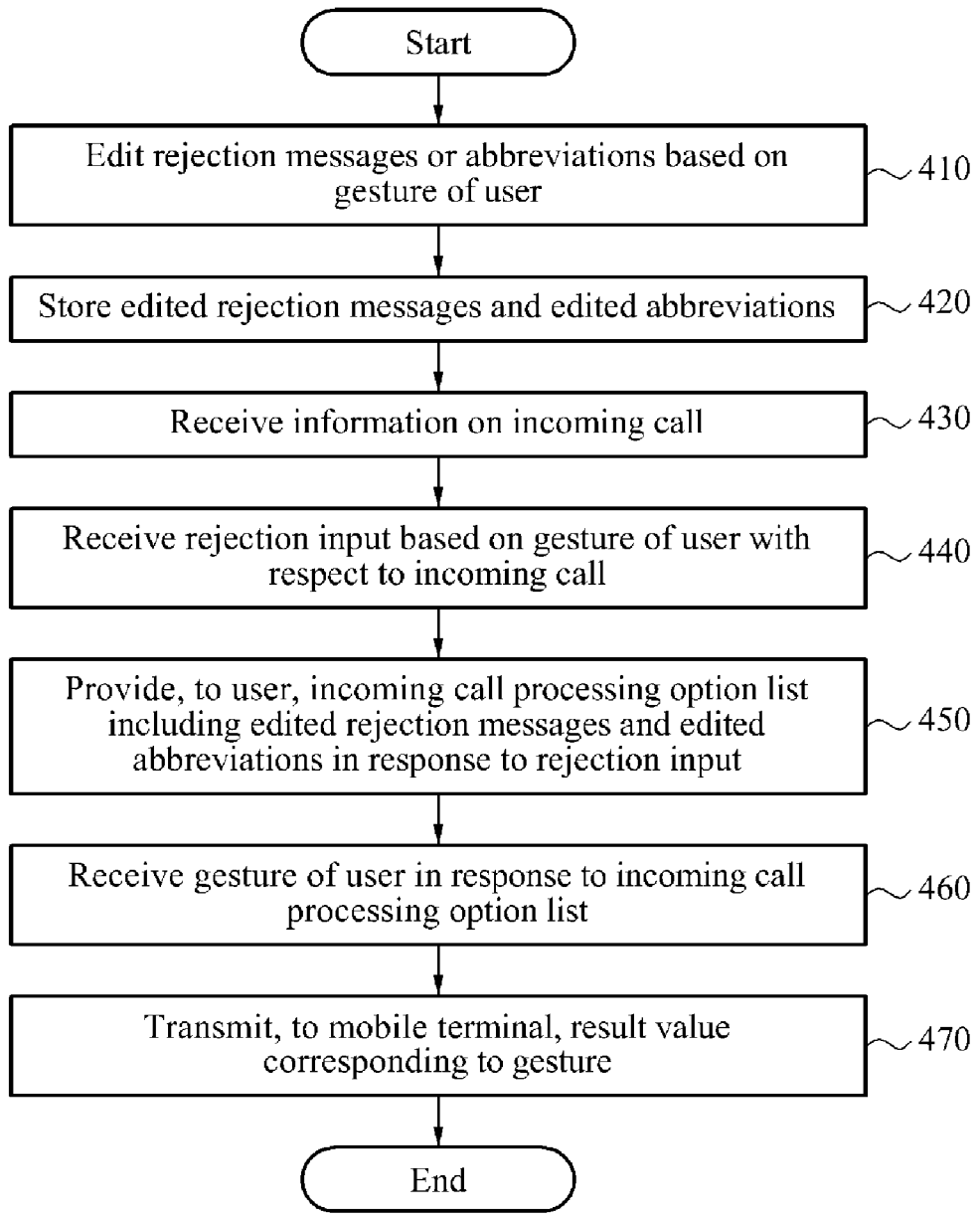
FIG. 4 is a flowchart illustrating yet another example of an operating method of a wearable device, in accordance with an embodiment.

FIG. 4 is a flowchart illustrating yet another example of an operating method of a wearable device, in accordance with an embodiment.

Referring to FIG. 4, in operation 410, the method at the wearable device edits rejection messages or abbreviations based on a gesture of a user. The method at the wearable device edits phrases of the rejection messages or the abbreviations based on the gesture of the user, for example, touching or dragging a keyboard displayed on a touch display.

The phrases of the rejection messages may include, for example, "I am on a business trip abroad" and "I am on vacation." The abbreviations of the rejection messages may include, for example, "business trip" and "vacation." The edited phrases of the rejection messages or the edited abbreviations of the rejection messages are transmitted to a call counterpart when a user provides a rejection input to reject an incoming call.

For example, the method at the wearable device selects, from among multiple icons, an icon corresponding to a rejection message based on the gesture of the user.

In operation 420, the method at the wearable device stores the edited rejection messages or the edited abbreviations in at least one of a memory of the wearable device and a mobile terminal.

In operation 430, the method at the wearable device receives information on the incoming call from the mobile terminal.

In operation 440, the method at the wearable device receives the rejection input to reject the incoming call based on the gesture of the user.

In operation 450, the method, through the wearable device, produces to the user, an incoming call processing option list including the rejection messages or the abbreviations edited in operation 410 in response to the rejection input.

In operation 460, the method at the wearable device receives the gesture from the user in response to the incoming call processing option list.

In operation 470, the method, through the wearable device, transmits to the mobile terminal a result value corresponding to the gesture of the user.

Figure 5:
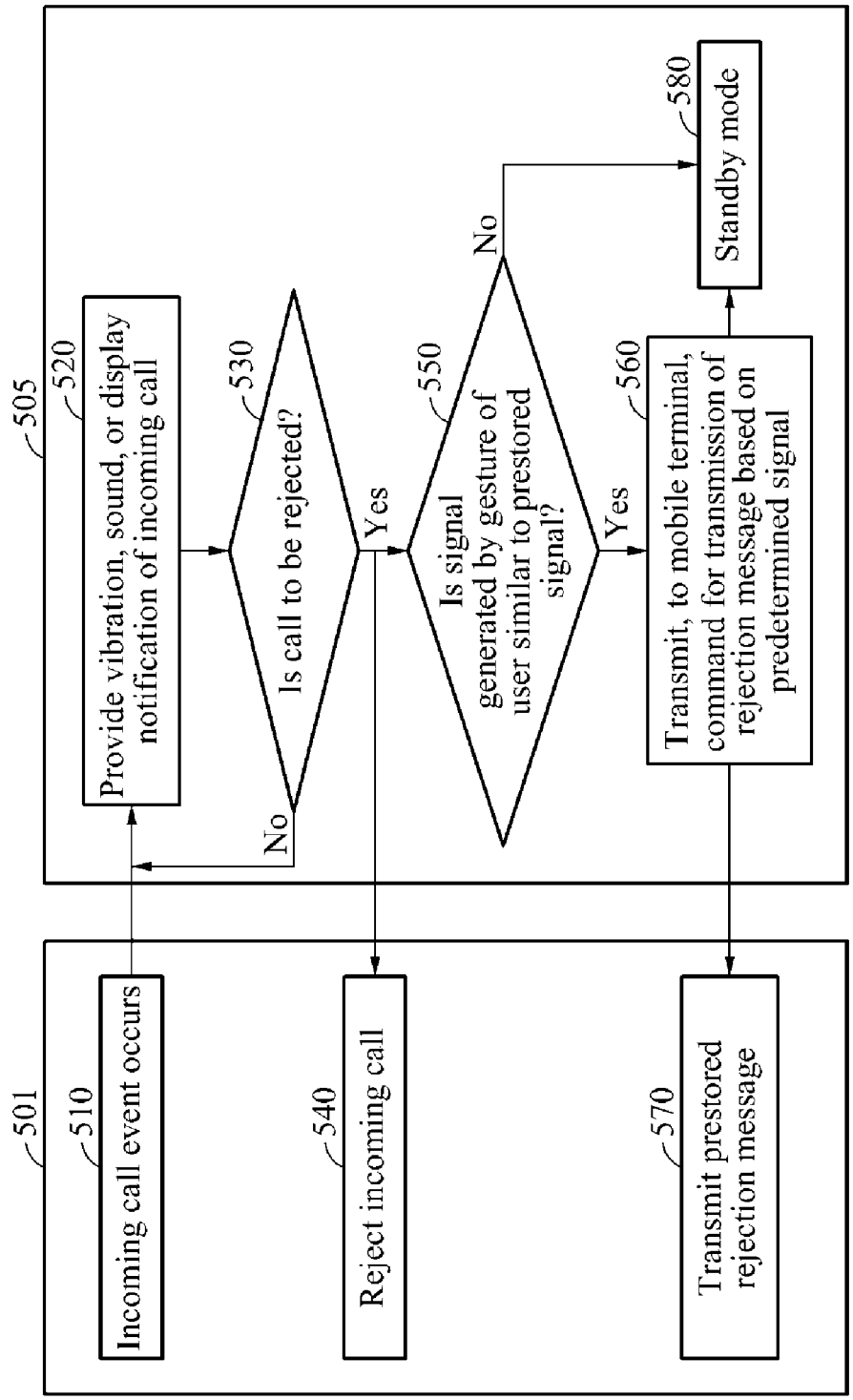
FIG. 5 is a diagram illustrating an example of an operation performed between a wearable device and a mobile terminal connected to the wearable device through short range communication, in accordance with an embodiment.

FIG. 5 is a diagram illustrating an example of an operation performed between a wearable device 505 and a mobile terminal 501 connected to the wearable device 505 through short range communication. In one illustrative example, the operations described in the following paragraphs and illustrated in FIG. 5 may be performed by hardware structure of the wearable device 900 described below and illustrated in FIG. 9.

Referring to FIG. 5, the wearable device 505 transmits a rejection message included in an incoming call processing option list in response to an incoming call to the mobile terminal 501.

At operation 510, in response to an incoming call event occurring in the mobile terminal 501, the method receives at the wearable device 505 the incoming call transmitted from the mobile terminal 501 through the short range communication. In operation 520, the wearable device 505 provides a vibration, sound, or display notification of the incoming call.

In operation 520, through the wearable device 505, the method continuously informs a user that the incoming call event is occurring until the user rejects or receives the incoming call, or a call counterpart terminates a call.

In operation 530, through the wearable device 505, the method determines whether the user provides a rejection input to reject the incoming call. When the method at the wearable device 505 determines that the user provides the rejection input in operation 530, the wearable device 505 transmits a signal to the mobile terminal 501 indicating that the incoming call is rejected by the user.

In operation 540, the mobile terminal 501 rejects the incoming call based on the signal transmitted in operation 530.

In response to the method at the wearable device 505 determining that the user provides the rejection input in operation 530, the method at the wearable device 505 selects, based on a gesture of the user, an option included in an incoming call processing option list displayed on a touch display of the wearable device 505, and transmits a rejection message based on the selected option. In operation 550, through the wearable device 505, the method senses a signal generated by the gesture of the user and determines whether the signal generated by the gesture of the user is similar to a pre-stored signal.

In operation 550, the method at the wearable device 505 determines whether the signal generated by the gesture of the user is similar to the pre-stored signal based on a predetermined degree of similarity, for example, at least 80% or 90% or above.

In operation 550, in response to the method at the wearable device 505 determining that the signal generated by the gesture of the user is not similar to the pre-stored signal, the wearable device 505 enters a standby mode in 580. The standby mode is a standby mode for the wearable device 505 to be reactivated when an incoming call event occurs.

In response to the method at the wearable device 505 determining that the signal generated by the gesture of the user is similar to the pre-stored signal, in operation 560, the method at the wearable device 505 transmits a command for a rejection message to be transmitted to the mobile terminal 501 based on a predetermined signal.

In one example, the rejection message based on the predetermined signal is pre-stored as a factory setting in the wearable device 505 or in the mobile terminal 501. When the user rejects the incoming call through the wearable device 505 operatively connected to the mobile terminal 501, the user selects a rejection message from among pre-stored rejection messages in the incoming call processing option list and the wearable device 505 transmits the command for the transmission of the selected rejection message.

In operation 580, the method directs the wearable device 505 transmitting the command for the transmission of the rejection message to the mobile terminal 501 to enter the standby mode.

In operation 570, the mobile terminal 510 receiving the command for the transmission of the rejection message from the wearable device 505 transmits a pre-stored rejection message to a mobile terminal of the call counterpart.

Figure 6:
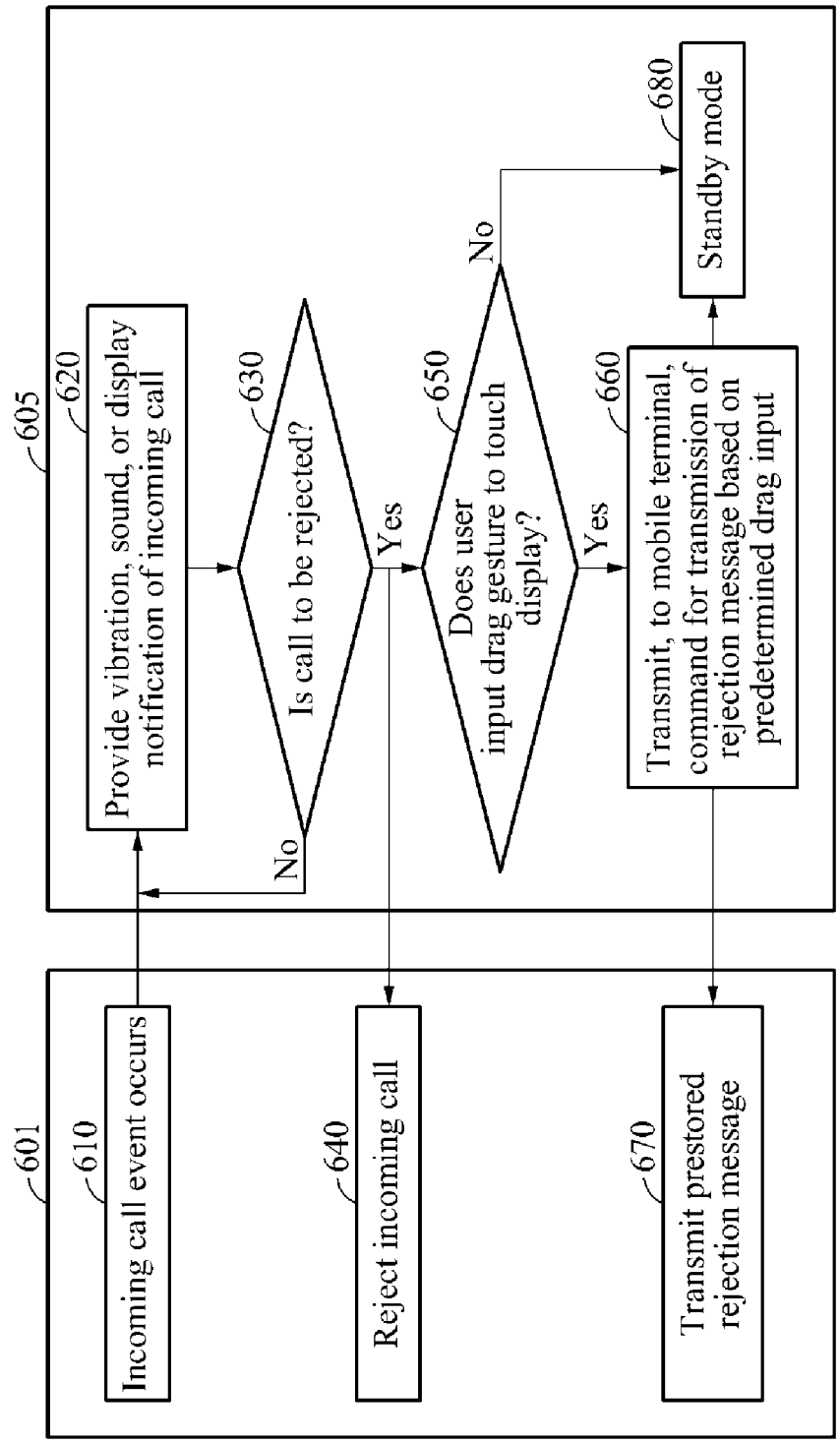
FIG. 6 is a diagram illustrating another example of an operation performed between a wearable device and a mobile terminal connected to the wearable device through short range communication, in accordance with an embodiment.

FIG. 6 is a diagram illustrating another example of a method performed between a wearable device 605 and a mobile terminal 601 operatively connected to the wearable device 605 through short range communication, in accordance with an embodiment. In one illustrative example, the operations described in the following paragraphs and illustrated in FIG. 6 may be performed by hardware structure of the wearable device 900 described below and illustrated in FIG. 9.

Referring to FIG. 6, the wearable device 605 transmits a rejection message to reject an incoming call to the mobile terminal 601. Descriptions of operations 610 through 640 of FIG. 6 may be identical to descriptions of operations 510 through 540 provided with reference to FIG. 5. Thus, the descriptions of operations 610 through 640 will be omitted here for brevity.

At operation 630, in response to the wearable device 605 determining that a user rejects the incoming call, the method at the wearable device 605 selects an option from an incoming call processing option list displayed on a touch display of the wearable device 605 through a drag input by the user, and transmits a rejection message based on the selected option.

In operation 650, the method at the wearable device 605 determines whether the user makes the drag input onto the touch display. The touch display of the wearable device 605 displays rejection messages, or abbreviations or icons of the rejection messages. One of the displayed rejection messages, the abbreviations, or the icons may be selected based on a direction of the drag input.

At operation 650, in response to the method at the wearable device 605 determining that the drag input is not made onto the touch display, at operation 680, the method directs the wearable device 605 to enter a standby mode.

At operation 650, in response to the method at the wearable device 605 determining that the drag input is made onto the touch display in 650, at operation 660, the method at the wearable device 605 transmits to the mobile terminal 601 a command for transmission of a rejection message based on a predetermined direction of the drag input.

In one configuration, the rejection message based on the predetermined direction of the drag input is pre-stored as a factory setting in the wearable device 605 or in the mobile terminal 601. When the user rejects the incoming call from the wearable device 605 connected to the mobile terminal 601 through the short range communication, the user selects a pre-stored rejection message from the incoming call processing option list and transmit the selected rejection message.

In operation 680, the wearable device 650 transmitting the command for the transmission of the rejection message to the mobile terminal 601 enters the standby mode.

In operation 670, the mobile terminal 601 receiving the command for the transmission of the rejection message from the wearable device 605 transmits the pre-stored rejection message to a mobile terminal of a call counterpart.

FIG. 7 is a diagram illustrating an example of a method of receiving a gesture of a user from a wearable device 710, in accordance with an embodiment.

Referring to FIG. 7, the wearable device 710 displays abbreviations included in an incoming call processing option list displayed on a display, for example, a touch display, of the wearable device 710. The abbreviations correspond to rejection messages.

As described in the foregoing, the wearable device 710 receives a gesture of the user in response to the incoming call processing option list, and transmits a result value corresponding to the gesture to a mobile terminal. Hereinafter, an example of transmitting a rejection message included in the incoming call processing option list will be described. However, options included in the incoming call processing option list are not limited to transmitting a rejection message.

The wearable device 710 includes at least one sensor, for example, an EMG sensor, an acceleration sensor, a gyro-sensor, a geomagnetic field sensor, an impedance sensor, a photosensor, a force sensor, a strain gauge, and a pressure sensor, to sense a gesture of the user. The wearable device 710 transmits, to the mobile terminal, the result value corresponding to the gesture of the user sensed at one or more sensors among rejection messages included in the incoming call processing option list. That is, the wearable device 710 transmits, to the mobile terminal, a rejection message selected by the gesture of the user.

Hereinafter, an example in which the wearable device 710 includes the EMG sensor will be described.

For example, when the wearable device 710 is attached to a wrist of the user, the wearable device 710 senses a signal generated from a finger gesture of the user through the EMG sensor. The wearable device 710 selects one of the rejection messages included in the incoming call processing option list. The selected rejection message corresponds to a signal sensed by the EMG sensor.

As illustrated in FIG. 7, abbreviations of the rejection messages, for example, "meeting," "driving," "class," and "later," are displayed on the touch display of the wearable device 710. Also, icons replaceable with the abbreviations, for example, meeting, driving, class, and later, are displayed on the touch display of the wearable device 710.

Signals to be generated by gestures of four fingers including a thumb through a ring finger of the user, for example, bending or unbending the fingers, are pre-stored in the wearable device 710 to match the abbreviations, for example, meeting, driving, class, and later, displayed on the touch display of the wearable device 710.

For example, when the user desires to select an abbreviation, "meeting," among the abbreviations displayed on the touch display, the user motions the thumb, by bending or unbending the thumb, to select a rejection message corresponding to the abbreviation, meeting. The wearable device 710 detects the thumb motion and transmits the rejection message to the mobile terminal.

In one illustrative example, the rejection messages, the abbreviations, and the icons may be pre-stored in the wearable device 710. In an illustrative example, the wearable device 710 enables a user to reconfigure the pre-stored messages, the abbreviations, and the icons. The wearable device 710 may also enable the user to reconfigure a direction of a touch or a drag from the wearable device 710 or the mobile terminal. Alternatively, a default value may be set by factory setting.

An example in which a wearable device includes an acceleration sensor will be described with reference to FIG. 8.

FIG. 8 is a diagram illustrating another example of a method of receiving a gesture of a user from a wearable device 810, in accordance with an embodiment.

Referring to FIG. 8, the wearable device 810 displays a rejection message on a display, for example, a touch display.

An example in which the wearable device 810 includes an acceleration sensor will be described hereinafter.

For example, when the wearable device 810 is attached to a wrist of the user, the wearable device 810 selects a rejection message based on a finger gesture of the user sensed by the acceleration sensor.

When the user rejects an incoming call, the touch display of the wearable device 810 displays abbreviations, for example, "meeting," "driving," "class," and "later," of rejection messages along with corresponding arrows. The touch display of the wearable device 810 displays icons replaceable with the abbreviations, for example, meeting, driving, class, and later.

The arrows pointing in respective directions correspond to directions in which the user drags the icons on the touch display. The arrows are displayed along with corresponding abbreviations of corresponding rejection messages. When the user drags an abbreviation, a corresponding rejection message is transmitted.

For example, when the user drags the meeting abbreviation in an upward direction, the rejection message, "I am in a meeting now, so I will call you later," corresponding to the meeting abbreviation is selected and transmitted.

Similarly, when the user drags the driving abbreviation in a leftward direction, the rejection message, "I am driving now, so I will call you later," corresponding to the driving abbreviation is selected and transmitted.

In an illustrative example, the wearable device 810 enables a user to reconfigure or redefine the rejection messages, the abbreviations, the icons, or a direction of a touch or a drag from the wearable device 810 or the mobile terminal. Alternatively, a default value may be a factory setting.

Figure 9:
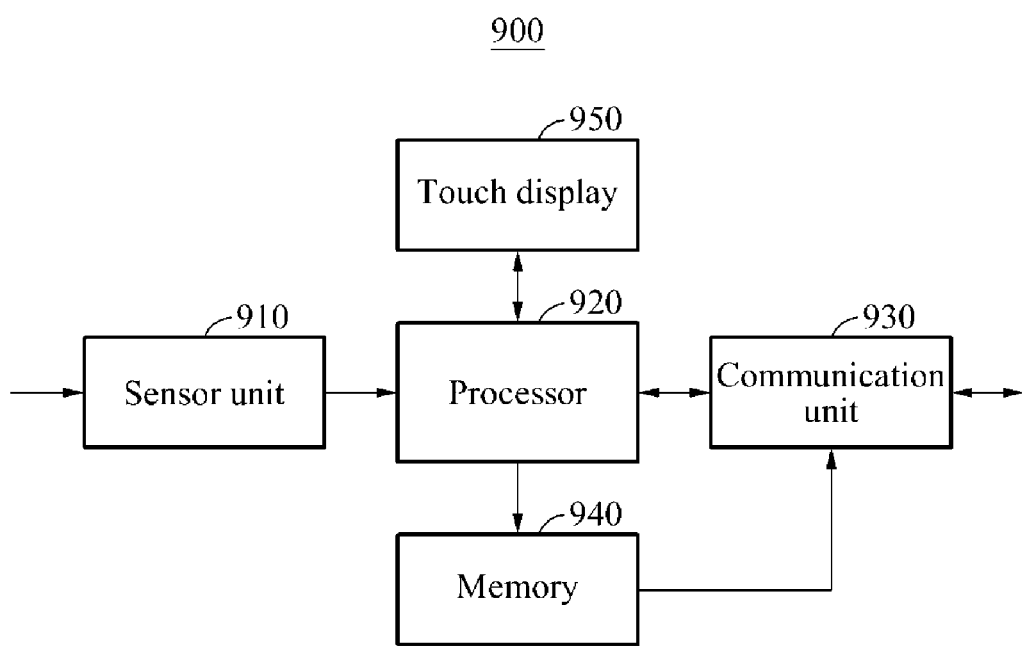
FIG. 9 is a block diagram illustrating an example of a wearable device, in accordance with an embodiment.

FIG. 9 is a block diagram illustrating an example of a wearable device 900, in accordance with an embodiment.

Referring to FIG. 9, the wearable device 900 includes a sensor unit 910, a processor 920, a communication unit 930, a memory 940, and a touch display 950.

The sensor unit 910 senses an input of a gesture of a user. The gesture of the user may include a touch or a drag input based on the incoming call processing option list displayed on the touch display 950 of the wearable device 900. Also, the gesture of the user may include at least one of an EMG signal generated before and after a muscular movement from the gesture of the user and an acceleration signal generated from the gesture of the user.

The gesture of the user may include an EMG signal, an acceleration signal, a geomagnetic change, a change in ambient light, and a change in pressure, that may be generated by a variety of gestures performed by the user with a portion of a body to which the wearable device 900 is attached, for example, bending or twisting a wrist, bending or unbending a finger, clenching a fist, turning a wrist, and moving a neck up and down, and left and right.

The sensor unit 910 includes at least one of an EMG sensor, an acceleration sensor, a gyrosensor, a geomagnetic field sensor, an impedance sensor, a photosensor, a force sensor, a strain gauge, and a pressure sensor.

The processor 920 controls the touch display 950 to display the incoming call processing option list stored in the memory 940 in response to receiving a rejection input from the user to reject the incoming call from a mobile terminal.

The processor 920 controls the communication unit 930 to transmit, to the mobile terminal, a result value corresponding to the gesture of the user in response to the incoming call processing option list.

In response to the rejection input, the processor 920 generates or produces the incoming call processing option list including pre-stored abbreviations of rejection messages pre-stored in the memory 940 or the mobile terminal.

The processor 920 produces the incoming call processing option list including edited abbreviations of rejection messages edited in the wearable device 900 or in the mobile terminal.

The processor 920 stores the edited rejection messages or the edited abbreviations in at least one of the memory 940 and the mobile terminal.

The communication unit 930 receives from the mobile terminal connected to the wearable device 900 through short range communication, information on the incoming call to the mobile terminal.

The memory 940 stores the incoming call processing option list. As previously explained, the incoming call processing option list may be, in the alternative, stored in the mobile terminal.

In a further alternative example, the incoming call processing option list may be stored in the memory 940 and in the mobile terminal. In the event that the wearable device 900 enables the user, through the processor 920, to modify the incoming call processing option list stored in the memory 940, the processor 920 would transmit through the communication unit 930 the modified incoming call processing option list to the mobile terminal.

The processor 920 compares an EMG signal or an acceleration signal generated by the gesture of the user to the pre-stored signal in the incoming call processing option list, and transmits a rejection message corresponding to a result of the comparing to the mobile terminal. The result value corresponding to the gesture of the user may include any one of the rejection messages, and abbreviations and icons corresponding to the rejection messages included in the incoming call processing option list, or an index of the rejection messages included in the incoming call processing option list.

The processor 920 receives the rejection input based on the gesture of the user to reject the incoming call to the mobile terminal.

The units and apparatuses described herein may be implemented using hardware components. The hardware components may include, for example, controllers, sensors, processors, transmitters, receivers, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

As a non-exhaustive illustration only, a terminal or device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

It is to be understood that in the embodiment of the present invention, the operations in FIGS. 1-6 are performed in the sequence and manner as shown although the order of some operations and the like may be changed without departing from the spirit and scope of the described configurations. In accordance with an illustrative example, a computer program embodied on a non-transitory computer-readable medium may also be provided, encoding instructions to perform at least the method described in FIGS. 1-6.

Program instructions to perform a method described in FIGS. 1-6, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein may be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method, comprising:
producing, at a wearable device, an incoming call processing option list in response to a rejection input from a user rejecting an incoming call from a mobile terminal; and
transmitting, from the wearable device to the mobile terminal, a result value corresponding to a gesture of the user and in response to the incoming call processing option list,
wherein the incoming call processing option list comprises pre-stored rejection messages and pre-stored abbreviations of the rejection messages, and wherein the gesture of the user comprises at least one of an electromyogram (EMG) signal generated before and after a muscular movement caused by the gesture of the user and an acceleration signal generated by the gesture of the user.

2. The method of claim 1, wherein the producing comprises:
producing the incoming call processing option list to comprise rejection messages pre-stored in the wearable device or the mobile terminal and pre-stored abbreviations of the rejection messages.

3. The method of claim 1, wherein the producing comprises:
producing the incoming call processing option list to comprise rejection messages edited in the wearable device or the mobile terminal and edited abbreviations of the rejection messages.

4. The method of claim 3, further comprising:
storing the edited rejection messages and the edited abbreviations in at least one of the wearable device and the mobile terminal.

5. The method of claim 1, wherein the gesture of the user comprises a touch or a drag input by the user in response to the incoming call processing option list displayed on a display of the wearable device.

6. The method of claim 1, wherein the transmitting comprises:
comparing the EMG signal or the acceleration signal to a pre-stored signal in response to the incoming call processing option list; and
transmitting a rejection message corresponding to a result of the comparing.

7. The method of claim 1, wherein the result value corresponding to the gesture of the user comprises at least one of rejection messages, and abbreviations and icons of the rejection messages comprised in the incoming call processing option list.

8. The method of claim 1, wherein the result value corresponding to the gesture of the user comprises an index of rejection messages comprised in the incoming call processing option list.

9. The method of claim 1, further comprising:
receiving the rejection input based on the gesture of the user to reject the incoming call to the mobile terminal.

10. A non-transitory computer readable storage medium storing an executable program being configured to control a processor to perform the method of claim 1.

11. A method, comprising:
producing, at a wearable device, an incoming call processing option list in response to a rejection input from a user rejecting an incoming call from a mobile terminal; and
transmitting, from the wearable device to the mobile terminal, a result value corresponding to a gesture of the user and in response to the incoming call processing option list,
wherein the incoming call processing option list comprises pre-stored rejection messages and pre-stored abbreviations of the rejection messages, and
wherein in response to the rejection input, the method further comprises:
sensing a signal generated by the gesture of the user;
determining whether the signal generated by the gesture of the user is a pre-stored signal; and
in response to determining that the signal generated by the gesture of the user is dissimilar to the pre-stored signal, entering a standby mode.

12. A wearable device, comprising:
a communication unit configured to receive from a mobile terminal an incoming call; and
a processor configured to receive a rejection input rejecting the incoming call, produce an incoming call processing option list in response to the rejection input, and control the communication unit to transmit to the mobile terminal a result value corresponding to a gesture received from a user and in response to the incoming call processing option list,
wherein the incoming call processing option list comprises pre-stored rejection messages and pre-stored abbreviations of the rejection messages, and
wherein the result value corresponding to the gesture of the user comprises at least one of rejection messages, and abbreviations and icons of the rejection messages comprised in the incoming call processing option list, wherein the at least one corresponds to the gesture of the user, or comprises an index of the rejection messages comprised in the incoming call processing option list.

13. The wearable device of claim 12, further comprising:
a sensor unit configured to sense an input of the gesture of the user in response to the incoming call processing option list,
wherein the sensor unit comprises at least one of an electromyogram (EMG) sensor, an acceleration sensor, a gyrosensor, a geomagnetic field sensor, an impedance sensor, a photosensor, a force sensor, a strain gauge, and a pressure sensor.

14. The wearable device of claim 12, wherein the processor is further configured to provide the incoming call processing option list comprising rejection messages pre-stored in the wearable device or the mobile terminal and pre-stored abbreviations of the pre-stored rejection messages in response to the rejection input.

15. The wearable device of claim 12, wherein the processor is further configured to produce the incoming call processing option list to comprise rejection messages edited in the wearable device or the mobile terminal and edited abbreviations of the edited rejection messages in response to the rejection input.

16. The wearable device of claim 15, wherein the processor is further configured to store the edited rejection messages and the edited abbreviations in at least one of the wearable device and the mobile terminal.

17. The wearable device of claim 12, wherein the gesture of the user comprises at least one of a touch or a drag input from the user in response to the incoming call processing option list, an electromyogram (EMG) signal generated before and after a muscular movement caused by the gesture of the user, and an acceleration signal generated by the gesture of the user.

18. The wearable device of claim 17, wherein the processor is further configured to compare the EMG signal or the acceleration signal generated by the gesture of the user to a pre-stored signal in response to the incoming call processing option list, and transmit a rejection message corresponding to a result of the comparing to the mobile terminal.

19. The wearable device of claim 12, wherein the processor is further configured to receive the rejection input based on the gesture of the user.

20. A wearable device, comprising:
a sensor configured to sense a gesture from a user in response to the user rejecting an incoming call from a mobile terminal; and
a processor configured to produce an incoming call processing option list in response to the user rejecting the incoming call, and transmit to the mobile terminal a result value corresponding to the gesture and based on the incoming call processing option list,
wherein the incoming call processing option list comprises pre-stored rejection messages and pre-stored abbreviations of the rejection messages, and
wherein the gesture of the user comprises an electromyogram signal, an acceleration signal, a geomagnetic change, a change in ambient light, and a change in pressure produced by gestures performed by the user with a portion of a body of the user to which the wearable device is attached.

21. The wearable device of claim 20, further comprising:
a touch display configured to display the incoming call processing option list.

22. A wearable device, comprising:
a sensor configured to sense a gesture from a user in response to the user rejecting an incoming call from a mobile terminal; and
a processor configured to produce an incoming call processing option list in response to the user rejecting the incoming call, and transmit to the mobile terminal a result value corresponding to the gesture and based on the incoming call processing option list,
wherein the incoming call processing option list comprises pre-stored rejection messages and pre-stored abbreviations of the rejection messages, and
wherein the sensor comprises at least one of an EMG sensor, an acceleration sensor, a gyrosensor, a geomagnetic field sensor, an impedance sensor, a photosensor, a force sensor, a strain gauge, and a pressure sensor.

* * * * *